Patented Oct. 30, 1934

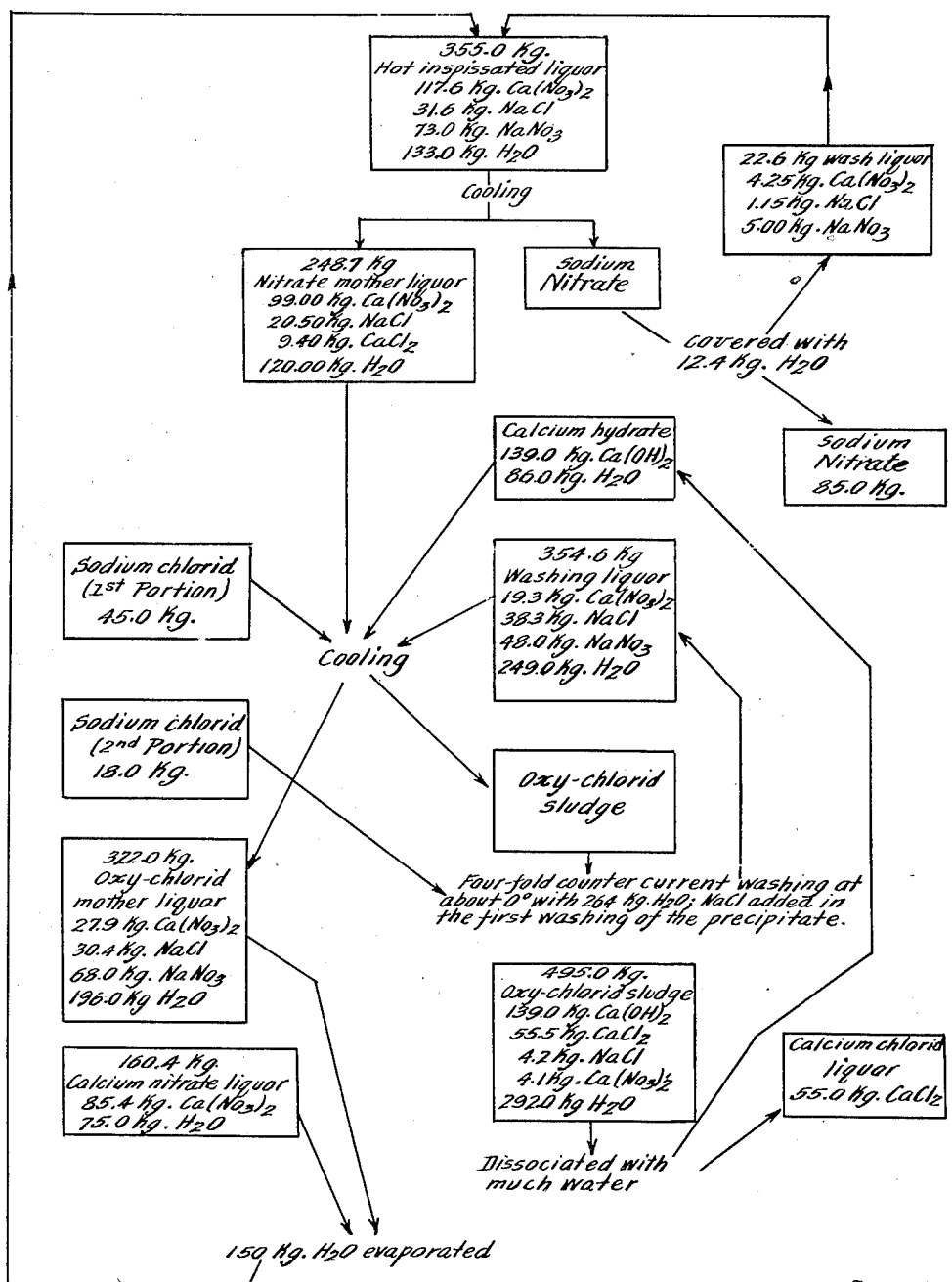

1,978,751

UNITED STATES PATENT OFFICE 1,978,751

PROCESS FOR MAKING ALKALI METAL NITRATES

Paul Kubelka, Prague, Czechoslovakia, and Wilhelm Schneider, Karlsruhe, Germany

Application May 5, 1932, Serial No. 609,530
In Germany May 8, 1931

12 Claims. (Cl. 23—102)

This invention relates to methods for the production of alkali metal nitrates, and more particularly from calcium nitrate or nitric acid by conversion in an aqueous medium.

Prior art methods for converting or decomposing calcium nitrate into alkali metal nitrates as by reaction with alkali metal chlorides in an aqueous medium, have not been satisfactory for a number of reasons. Thus attempts to convert calcium nitrate with alkali metal chlorides in an aqueous medium utilizing equivalent amounts of calcium nitrate and sodium chloride in the reacting mixture, or in solution, and employing room or higher temperatures, followed by cooling to separate sodium nitrate, has resulted in sodium nitrate which is always contaminated substantially with sodium chloride. While the use of smaller amounts of sodium chloride than that corresponding to the equivalent proportions may be used in such processes to produce a more pure sodium nitrate, the yield of the sodium nitrate is so small as to make the process commercially infeasible.

If potassium chloride is used in lieu of sodium chloride in such prior art processes, a less contaminated potassium nitrate may be obtained, and in somewhat higher yields than that obtained with sodium chloride, but the conversion is still technologically unsatisfactory, since yields exceeding approximately 60% cannot be obtained.

Similarly the conversion of nitric acid by reaction with alkali metal chlorides in aqueous solution proceeds analogously to the reaction of calcium nitrate with alkali metal chloride as described above. A certain amount of the alkali metal nitrate may be obtained in such instances, but the quantity obtained is insufficient for practical operations.

Among the objects of the present invention are included processes for the recovery of alkali metal nitrates from calcium nitrate or nitric acid by reaction of such compounds with alkali metal chlorides in aqueous solution, wherein high and substantial yields of the alkali metal nitrates are obtained.

Other and further objects and advantages of the present process will appear from the more detailed description given below, it being understood, however, that this more detailed description is given by way of explanation and illustration only, and not by way of limitation, since various changes therein may be made by those skilled in the art without departing from the scope and spirit of the present invention.

In connection with that more detailed description, there is shown in the accompanying drawing, a flow sheet illustrating the production of sodium nitrate from calcium nitrate and sodium chloride by a cyclic process in accordance with the present invention.

Considering more generally the processes involved in the present invention, it has been found that the disturbing influence in the recovery of alkali metal nitrates from calcium nitrate or nitric acid by reaction with alkali metal chlorides in aqueous solution, resides in the effects exerted by the calcium and chlorine ions in the mother liquors, and that such ions constitute an obstructing influence in the separation of pure alkali metal nitrates in substantial quantities. It has further been found that the undesirable effects of the calcium and chlorine ions may be eliminated in a relatively simple manner if the mother liquors are treated to precipitate the more difficultly soluble calcium oxychloride or basic calcium chloride, followed by removal of such oxychloride by filtration. The basic calcium chloride is readily precipitated in such mother liquors by calcium hydroxide, for example. The resulting precipitate of the calcium oxychloride or basic calcium chloride may vary depending on the conditions of the precipitation, but will usually be found to have the formula:

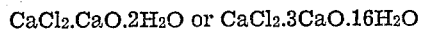

$$CaCl_2.CaO.2H_2O \text{ or } CaCl_2.3CaO.16H_2O$$

either of which compounds is sufficiently difficultly soluble under the given conditions to permit the removal of the greater part of the chlorine and calcium ions from the mother liquors of the alkali metal nitrate containing solutions.

In the application of such treatment, the mother liquor resulting from a first separation of the alkali metal nitrate from the reaction mixture of the calcium nitrate, for example, and the alkali metal chloride, is treated with calcium hydroxide, for example, to precipitate the basic calcium chloride, which is then removed from the resulting reaction mixture, and the mother liquor remaining after the separation of the basic calcium chloride is employed in further separation and recoveries of the alkali metal nitrate. For example, the mother liquor, after the addition of fresh amounts of alkali metal chloride where desired, is capable, upon cooling of separating out further alkali metal nitrate in a substantially pure condition. Because of the more favorable composition of the mother liquor under these circumstances, the amount of substantially pure alkali metal nitrate obtainable upon the second separation is considerably greater than that obtained after the first conversion step.

The precipitation of the oxychloride (basic calcium chloride) may be repeated if desired in the mother liquor resulting from the second separation step, and a renewed crystallization carried out. However, in general, it is preferable to use the solution remaining after the filtration of the calcium oxychloride (basic calcium chloride) as a medium for solution of additional amounts of the reaction materials, whereby a cyclic process completely utilizing the reacting materials is provided.

The calcium oxychloride (basic calcium chloride) resulting from the precipitation with milk of lime, after filtration and separation, is desirably washed in order to recover any adherent nitrate, and for such washing operation, solutions of the alkali metal chloride are desirably employed. Preferably the solution of the alkali metal chloride for such washing operation should be saturated. After washing, the oxychloride (basic calcium chloride) may be desirably employed for recovery of calcium oxide or hydrated calcium oxide, or calcium hydroxide, and for this purpose may advantageously be decomposed by means of hot water into calcium oxide and calcium chloride, these substances being readily separated one from the other. The calcium chloride liquor thus resulting may be obtained in fairly concentrated form, and further concentrated by evaporation to yield a substantially pure calcium chloride by-product. The lime sludge remaining and recovered from the calcium chloride is desirably re-utilized in the process for precipitation of calcium oxychloride (basic calcium chloride) as described above.

The washings obtained as set forth above by washing the calcium oxychloride (basic calcium chloride) to recover any adherent nitrate, may desirably be added to the basic calcium chloride mother liquor, and the basic calcium chloride mother liquor including such washings may then desirably be utilized for recovering alkali metal nitrate therefrom by the methods herein set forth.

If the precipitation of the calcium oxychloride has been carried out to produce the highly basic calcium chloride containing 16 molecules of water of crystallization, as indicated in the formula given above, such basic oxychloride may be filtered off and washed, and the resulting precipitate may be readily decomposed, for example, by a mere slight heating. The calcium chloride under such treatment dissolves in the water of crystallization, and may thus be separated in the form of a highly concentrated solution. The residue may then be washed out with water for removing any remaining calcium chloride, any dilute solution of calcium chloride thereby resulting, may advantageously be allowed to run to waste.

On the other hand, the basic calcium chloride obtained in accordance with the method of precipitation set forth above may be initially treated with small amounts of water at room temperature, or at higher temperatures, to effect decomposition. By this method of procedure, it is possible to obtain almost all of the calcium chloride in a form which is again readily recoverable. It is always advisable to use this last referred to method when basic calcium chloride containing 2 molecules of water of crystallization, as indicated above, is being subjected to the treatment.

Considering the recovery of the alkali metal nitrates from nitric acid as indicated above, it has been pointed out that the conversion of nitric acid by reaction with an alkali metal chloride in aqueous solution, proceeds similarly to that of the conversion of calcium nitrate by reaction with the alkali metal chloride, but that only a relatively small amount of the alkali metal nitrate is recoverable, an insufficient amount for practical operation. On the other hand, by application of the methods of the present invention, very substantial recoveries of alkali metal nitrate may be obtained from nitric acid. For this purpose, the residual liquor resulting from the initial separation of the alkali metal nitrate from the reaction mixture of the nitric acid and alkali metal chloride, is treated to separate the chlorine ions in the same way as in the treatment of calcium nitrate referred to above, as for example, by the addition of calcium hydroxide in amount sufficient to precipitate the basic calcium chloride. It will be apparent that in the precipitation of the basic calcium chloride in such circumstances, the free acid present in the reaction mixture must first be neutralized, so that calcium nitrate is formed. The further conversion then takes place between the calcium nitrate and the alkali metal chloride.

It will also be apparent that mixtures of calcium nitrate and nitric acid may also be utilized for the recovery of the alkali metal nitrates in accordance with the processes set forth above.

In either of these cases, when nitric acid is present in the reaction mixture from which the alkali metal nitrate is to be recovered, which alkali metal nitrate has resulted from reaction of the nitric acid with the alkali metal chloride, the nitric acid is converted into calcium nitrate in the course of the process, as for example in the precipitation of the calcium oxychloride out of the reaction liquid. The precipitation of the calcium oxychloride under those circumstances where nitric acid was originally present, of course, requires greater amounts of calcium hydroxide, corresponding to the greater consumption for the neutralization of the free acid present.

In carrying out these reactions, the alkali metal chlorides may be employed, particularly sodium and potassium chlorides. It is desirable to start with a considerable excess of the nitrate (with respect to the molecular proportions), although this feature per se is not essential for the processes set forth herein. Desirably, the solutions are made and kept as concentrated as possible at the temperature of operation, whether that be room temperature or a higher temperature.

There follow below certain embodiments exemplifying the carrying out of processes for the recovery of alkali metal nitrates in accordance with the present invention.

*Example I*

82 kg. calcium nitrate (computed as anhydrous calcium nitrate) and 74.6 kg. of potassium chloride are introduced into 165.1 kg. of water with vigorous stirring, and while cooling to about 0° C. 63.7 kg. of potassium nitrate separate out, while residual amounts of salts and conversion products go into solution. The potassium nitrate which separates is filtered off with suction, and the remaining mother liquor which contains 30.3 kg. calcium nitrate, together with 27.6 kg. potassium chloride and 35 kg. calcium chloride, is treated with a suspension of 77 kg. calcium hydroxide in 146 kg. of water. Upon cooling again to 0° C., calcium oxychloride separates out, and is filtered off with suction. The filtrate still contains about 20 kg. calcium nitrate and 18 kg. potassium chloride, dissolved in about 170 kg. water. Evaporation of this filtrate to remove 120 kg. water, followed by cooling to about 0° C. yields approximately 16 kg. of potassium nitrate.

If instead of concentrating the filtrate obtained from the oxychloride separation by evaporation, as given in the example above, it is again enriched in calcium nitrate and potassium chloride, the yield of nitrate can be materially improved. Further, the quantities of the reaction substances adhering to the calcium oxychloride precipitate are desirably recovered by washing. These wash waters then serve either as mother liquors or solvents for new quantities of calcium nitrate and potassium chloride, or are added to the main solution, particularly after concentration by evaporation, for example. It may be noted that the separation of calcium oxychloride may be repeated as often as desired in the residual liquors from the potassium nitrate crystallization.

Instead of converting the calcium nitrate by treatment with potassium chloride, the conversion may be carried out with sodium chloride, in which event the necessary changes in charges, etc. must be made to correspond with the changed solubility conditions. Further instead of calcium nitrate, nitric acid may be treated to yield corresponding nitrates of the alkali metals, but as noted above in such case an increased amount of lime must be added in forming the oxychloride in order to neutralize the free acid.

Example II

The second example represents the conversion treatment of calcium nitrate with sodium chloride to produce sodium nitrate, and may be carried out as a closed cyclic process as illustrated in the accompanying drawing, which explains the interrelation between the individual operations. The proportions and concentrations of the liquors in the several operations are indicated on the drawing. It may be noted that in the main, the illustrated procedure consists in subjecting the end liquor produced from the preceding cycle of the process to energetic cooling to about 0° C. to separate off sodium nitrate. The sodium nitrate is washed as by covering with water, as little water as possible being employed. The resulting liquor from the washing of the sodium nitrate is returned to the crystallization liquor in the next cycle.

The mother liquor from the nitrate crystallization, after the addition of sodium chloride and the washing liquor from the preceding washing of the calcium oxychloride, is cooled to about 0°, and calcium hydroxide suspended in water is added. Upon cooling to about 0°, calcium oxychloride separates out and may be freed from adherent reaction substances by a counter-current washing with water containing common salt, preferably carried out at about 0° C. The washed oxychloride sludge is finally dissociated with water, at a higher temperature, yielding on the one hand, a calcium chloride liquor, which may be either discharged to waste, or concentrated by evaporation, and on the other hand yielding calcium hydroxide, which is returned into the process, as indicated on the drawing, as the precipitating lime for forming the calcium oxychloride.

The mother liquor from the separation of the calcium oxychloride in accordance with the process outlined on the drawing, is then enriched with calcium nitrate, and desirably concentrated by evaporation. To this liquor, the liquor obtained by washing of the sodium nitrate in the preceding cycle is added, and the resulting liquor is again cooled in order to separate out sodium nitrate.

It may be particularly noted that no by-products are produced in the cyclic process with the exception of the calcium chloride liquor, which is obtained in the dissociation of the calcium oxychloride by the water. There are practically no losses of reaction substances introduced in the process, due to the continual re-utilization of all wash waters and washing liquors. Consequently the yield of sodium nitrate amounts to at least 95% computed upon the basis of calcium nitrate, as well as upon the basis of sodium chloride. The consumption of heat and power in the carrying out of this process is relatively small, and the apparatus required is quite simple.

Example III

The following example is given for comparative purposes to show the difference between applicant's method as compared with prior art methods.

In the prior art it has been attempted to increase the conversion of calcium nitrate into alkali metal nitrates by reaction with alkali metal chloride in aqueous solution, by concentrating by evaporation the residual liquor from the first crystallization of the alkali metal nitrate to a content of about 30–35% calcium chloride, followed by strong cooling. The advantages of this process are, however, but slight, as is evidenced by the following experimental data.

From a solution at elevated temperatures of 74.6 g. of potassium chloride and 118 g. $Ca(NO_3)_2.4H_2O$, corresponding to 82 g. anhydrous calcium nitrate, in 125 g. water, upon cooling to 15° C., 51 g. of potassium nitrate separate out. The residual liquor amounted to 264 g.

This liquor was now concentrated to 180 g. and cooled. Upon cooling to +15° C., 31 g. of a salt mixture separates out, and upon further cooling to —10° C., 13 g. more of the salt mixture was obtained. The final liquor upon analysis, was found to contain 32 g. more of ($CaCl_2$+KCl) as well as 36 g. of calcium nitrate.

From this it will be noted that: 42 g. calcium nitrate were converted into potassium nitrate in the first step of the process, 4 g. calcium nitrate were separated out in the salt mixture in working up the residual liquor, and 36 g. calcium nitrate remain in the final liquor and are thus lost.

The utilization of the calcium nitrate which amounts to about 50% in the first step, is accordingly increased by only about 4% by the complex precedure of this suggested process.

On the contrary in accordance with the present invention, if the residual liquor of the first conversion step be treated with 80 g. calcium hydroxide and with 200 g. water, and then cooled to 0° C., and then separated as by decantation, removal by suction, etc., from the deposited calcium oxychloride, there is obtained 326 g. of a liquor, which after concentration by evaporation to 135 g. and again cooling, yields a deposit of 21 g. potassium nitrate. The utilization of the calcium nitrate accordingly, even after but a single treatment of the residual liquor with lime amounts to 71%; it may be increased to 95% and higher by repeating the treatment, and particularly by carrying out the process as a continuous cyclic operation.

Having thus set forth our invention, we claim:

1. In a process for recovering alkali metal nitrates from solutions produced by the interaction of a compound selected from the group consisting of calcium nitrate and nitric acid, with an alkali metal chloride, and including crystallization of alkali metal nitrate from such solutions to leave a nitrate mother liquor, the step of precipitating basic calcium chloride in the nitrate mother liquor.

2. In a process for recovering alkali metal nitrates from solutions produced by the interaction of a compound selected from the group consisting of calcium nitrate and nitric acid, with an alkali metal chloride, and including crystallization of alkali metal nitrate from such solutions to leave a nitrate mother liquor, the steps of precipitating basic calcium chloride in the nitrate mother liquor, separating the basic calcium chloride, and recovering alkali metal nitrate from the resulting basic chloride mother liquor.

3. A process of recovering alkali metal nitrates which comprises reacting an alkali metal chloride with a compound selected from the group consisting of calcium nitrate and nitric acid, separating alkali metal nitrate from the reaction mixture, leaving a nitrate mother liquor, adding calcium hydroxide to the nitrate mother liquor to precipitate basic calcium chloride, separating the precipitated basic calcium chloride, and recovering alkali metal nitrate from the basic chloride mother liquor.

4. A process of recovering alkali metal nitrates which comprises reacting an alkali metal chloride with a compound selected from the group consisting of calcium nitrate and nitric acid, separating alkali metal nitrate from the reaction mixture, adding calcium hydroxide to the nitrate mother liquor to precipitate basic calcium chloride, separating the precipitated basic calcium chloride, adding alkali metal chloride and a compound selected from the group consisting of calcium nitrate and nitric acid to the basic chloride mother liquor, and recovering alkali metal nitrate from the resulting liquor.

5. A process of recovering alkali metal nitrates which comprises reacting an alkali metal chloride with a compound selected from the group consisting of calcium nitrate and nitric acid, the amount of the compound selected from the group consisting of calcium nitrate and nitric acid exceeding the equivalent proportions required for such reaction, separating alkali metal nitrate from the reaction mixture, adding calcium hydroxide to the nitrate mother liquor to precipitate basic calcium chloride, separating the precipitated basic calcium chloride, leaving a basic chloride mother liquor, and recovering alkali metal nitrate from the basic chloride mother liquor.

6. A process of recovering alkali metal nitrates which comprises reacting an alkali metal chloride with a compound selected from the group consisting of calcium nitrate and nitric acid, separating alkali metal nitrate from the reaction mixture, leaving a nitrate mother liquor, adding calcium hydroxide to the nitrate mother liquor to precipitate basic calcium chloride, separating the precipitated basic calcium chloride leaving a basic calcium chloride mother liquor, washing the separated basic calcium chloride with an aqueous solution of the alkali metal chloride, adding said washings to the basic calcium chloride mother liquor, and recovering alkali metal nitrate from the basic chloride mother liquor.

7. In a process for recovering alkali metal nitrates from solutions produced by the interaction of a compound selected from the group consisting of calcium nitrate and nitric acid, with an alkali metal chloride, and including crystallization of alkali metal nitrate from such solutions to leave a nitrate mother liquor, the steps of precipitating basic calcium chloride in the nitrate mother liquor, separating the basic calcium chloride leaving a basic calcium chloride mother liquor, washing the separated basic calcium chloride with an aqueous solution of the alkali metal chloride, adding said washings to the basic calcium chloride mother liquor, and recovering alkali metal nitrate from such liquor.

8. A process of recovering alkali metal nitrates which comprises reacting an alkali metal chloride with calcium nitrate, separating alkali metal nitrate from the reaction mixture leaving a nitrate mother liquor, precipitating basic calcium chloride in said nitrate mother liquor, separating the precipitated basic calcium chloride, leaving a basic calcium chloride mother liquor, and recovering alkali metal nitrate from the basic chloride mother liquor.

9. A process of recovering alkali metal nitrates which comprises reacting an alkali metal chloride with nitric acid, separating alkali metal nitrate from the reaction mixture, leaving a nitrate mother liquor, converting any nitric acid present in such nitrate mother liquor into calcium nitrate, precipitating basic calcium chloride in said nitrate mother liquor, separating the basic calcium chloride leaving a basic calcium chloride mother liquor, and recovering alkali metal nitrate from the basic chloride mother liquor.

10. A cyclic process for recovering alkali metal nitrates which comprises reacting calcium nitrate and an alkali metal chloride in aqueous solution, separating alkali metal nitrate therefrom leaving a nitrate mother liquor, adding calcium hydroxide to the nitrate mother liquor to precipitate basic calcium chloride, separating the basic calcium chloride leaving a basic calcium chloride mother liquor, adding calcium nitrate and alkali metal chloride to said basic calcium chloride mother liquor, and recovering further alkali metal nitrate therefrom by repetition of the stated steps of the process.

11. A process of recovering alkali metal nitrates, which comprises reacting an alkali metal chloride with a compound selected from the group consisting of calcium nitrate and nitric acid, separating alkali metal nitrate from the reaction mixture leaving a nitrate mother liquor, adding calcium hydroxide to the nitrate mother liquor to precipitate basic calcium chloride, separating the precipitated basic calcium chloride leaving a basic calcium chloride mother liquor, and recovering calcium hydroxide from said basic calcium chloride.

12. In a process for recovering alkali metal nitrates from solutions produced by the interaction of a compound selected from the group consisting of calcium nitrate and nitric acid, with an alkali metal chloride, and including crystallization of alkali metal nitrate from such solutions to leave a nitrate mother liquor, the steps of precipitating basic calcium chloride in the nitrate mother liquor, separating the basic calcium chloride leaving a basic calcium chloride mother liquor, and recovering calcium hydroxide from said basic calcium chloride.

PAUL KUBELKA.
WILHELM SCHNEIDER.